United States Patent
Sen et al.

(10) Patent No.: US 9,894,462 B2
(45) Date of Patent: Feb. 13, 2018

(54) INTEGRATED APPROACH FOR VISUAL DIALING

(71) Applicant: Apple Inc., Cupertino, CA (US)

(72) Inventors: Abhishek Sen, San Jose, CA (US); Toufic Haddad, Paris (FR)

(73) Assignee: APPLE INC., Cupertino, CA (US)

( * ) Notice: Subject to any disclaimer, the term of this patent is extended or adjusted under 35 U.S.C. 154(b) by 399 days.

(21) Appl. No.: 13/677,127

(22) Filed: Nov. 14, 2012

(65) Prior Publication Data

US 2014/0134979 A1 May 15, 2014

(51) Int. Cl.
| | |
|---|---|
| *H04W 4/00* | (2009.01) |
| *H04M 3/493* | (2006.01) |
| *H04L 29/06* | (2006.01) |
| *H04M 1/2745* | (2006.01) |
| *H04M 1/56* | (2006.01) |
| *H04W 12/06* | (2009.01) |
| *H04W 12/08* | (2009.01) |

(52) U.S. Cl.
CPC .......... *H04W 4/003* (2013.01); *H04L 63/105* (2013.01); *H04M 1/2745* (2013.01); *H04M 1/56* (2013.01); *H04M 3/493* (2013.01); *H04W 12/06* (2013.01); *H04W 12/08* (2013.01)

(58) Field of Classification Search
CPC .............. H04M 3/493; H04M 3/5166; H04M 2203/252; H04M 2203/355; H04M 2201/42; H04M 2203/251; H04M 2203/254; H04M 2203/255; H04W 12/08; H04W 12/06; H04W 4/20; H04W 4/24

USPC .......... 455/418, 419, 410, 414.1, 565, 574; 379/265.01–266.09

See application file for complete search history.

(56) References Cited

U.S. PATENT DOCUMENTS

| | | | |
|---|---|---|---|
| 5,802,526 A * | 9/1998 | Fawcett ................. | G06F 3/167 348/14.06 |
| 6,823,054 B1 * | 11/2004 | Suhm et al. .................. | 379/134 |
| 7,903,800 B2 | 3/2011 | Kumhyr | |
| 8,000,454 B1 * | 8/2011 | Or-Bach ............... | G06Q 20/10 379/100.14 |
| 8,243,900 B2 | 8/2012 | Kumhyr | |
| 8,265,234 B2 | 9/2012 | Singh | |

(Continued)

OTHER PUBLICATIONS

Radish Systems, LLC, "ChoiceView Visual IVR," http://www.radishsystems.com/products/the-choiceview-ivr, converted to PDF Aug. 7, 2013, 2 pages.

*Primary Examiner* — Daniel Lai
(74) *Attorney, Agent, or Firm* — Morgan, Lewis & Bockius LLP

(57) ABSTRACT

A business can register a finite state machine with a server. This finite state machine can express a tree structure of menus. The registration can cause the finite state machine to be mapped to the business's telephone number on the server. A mobile device can receive user input that manifests the intent to make a telephone call. In response to receiving the user input, the mobile device can determine that the telephone number that the user intends to call is mapped to a business's registered finite state machine on the server. The mobile device can then cause menus of selectable options, indicated in the business's registered finite state machine, to be displayed to the user in an interactive manner instead of placing the telephone call that the user intended to make.

21 Claims, 11 Drawing Sheets

(56) References Cited

U.S. PATENT DOCUMENTS

| | | | |
|---|---|---|---|
| 8,509,746 B1* | 8/2013 | Breau et al. | 455/414.1 |
| 8,537,989 B1* | 9/2013 | Lavian et al. | 379/93.17 |
| 2002/0069293 A1* | 6/2002 | Natalio | 709/238 |
| 2004/0088167 A1* | 5/2004 | Sartini | H04M 3/2218 704/270.1 |
| 2005/0055433 A1* | 3/2005 | Mathew | G06Q 10/06 709/223 |
| 2008/0220810 A1 | 9/2008 | Landschaft et al. | |
| 2009/0055915 A1* | 2/2009 | Piliouras | 726/8 |
| 2009/0147932 A1 | 6/2009 | McGuire et al. | |
| 2009/0154666 A1* | 6/2009 | Rios | G06F 3/04895 379/88.18 |
| 2010/0087175 A1* | 4/2010 | Roundtree | H04M 3/42178 455/414.1 |
| 2010/0226489 A1* | 9/2010 | Sarkar | H04M 3/5166 379/265.09 |
| 2010/0278316 A1* | 11/2010 | Beauregard | H04M 3/493 379/88.01 |
| 2011/0286586 A1* | 11/2011 | Saylor | H04M 3/493 379/88.13 |
| 2012/0008755 A1* | 1/2012 | Mittal | 379/93.01 |
| 2013/0003957 A1* | 1/2013 | Singh et al. | 379/218.01 |

\* cited by examiner

INTEGRATED APPROACH FOR VISUAL DIALING

BACKGROUND

The present disclosure relates generally to mobile devices, and in particular to techniques for using mobile devices to communicate in a visual manner.

Computers and other electronic devices can communicate with each other over networks such as local area networks, wide area networks, and the Internet. Mobile devices such as cell phones, including so-called smart phones, can communicate with each other wirelessly over a variety of wireless networks including 3G and 4G networks. Such mobile devices also can communicate over the Internet with remote servers using protocols such as Transmission Control Protocol (TCP), Internet Protocol (IP), and Hypertext Transfer Protocol (HTTP).

Mobile device users sometimes call customer support or technical support centers of businesses to obtain service or assistance or information regarding products that those users have obtained or are interested in obtaining from those businesses. Mobile device users sometimes call customer report representatives in order to inquire about billed amounts that are due, or to make a payment on a bill, or to set up or cancel a subscription. Often, before a caller actually reaches a live human being on the other end of the call, the caller finds himself listening to automated, simulated or recorded voices informing him of his options. These voices typically instruct the caller to say a word or push a number on his telephone or telephone application in order to proceed to the next set of options. The caller might need to navigate through multiple vocally read sets of options before the caller finally reaches his desired destination at the call center.

Unfortunately, because voice communication is a sequential type of presentation by nature, a caller is often forced to sit through the audible rehearsal of various options in which he is not interested before finally being audibly presented with an option in which he is interested. The caller usually has no control over the speed at which these options are audibly communicated to him through the speaker on his mobile device. Often, the caller will impatiently wait to hear all of the options vocally recited before trying to figure out which one of those options he ought to select. Because audible communications are transitory in nature and not fixed on any tangible medium, the caller might forget exactly what some of the previously recited options were by the time the last option has been spoken; he might be forced to request that the entire set of options be repeated. This repetition is wasteful of the caller's time and irritating to the caller.

SUMMARY

According to an embodiment of the invention, a business can register a finite state machine (FSM) with a server. This finite state machine can express a tree structure of menus, each menu including a set of selectable options. The finite state machine can specify the menus which are to be presented in response to the selections of various options in the tree structure, thus linking options to menus. In registering the finite state machine with the server, the business can indicate its telephone number to the server, so that the server can store a mapping between the business's telephone number and the business's registered finite state machine. Various different businesses can register their various different finite state machines with the server in this manner, and can have their telephone numbers mapped to their finite state machines. These mappings, stored on the server, can be made accessible over wireless networks to multiple mobile devices such as cell phones, including smart phones.

A mobile device can receive user input through a telephony application executing on that mobile device. The user input can manifest the intent to make a telephone call. For example, the user input can involve the depressing of digit buttons on a representation of a keypad in order to enter a telephone number; or the user input can involve the user's speaking, into a microphone of the mobile device, of the name of an entity to which the user wants to place a telephone call; or the user input can involve the user's selection, from a contact list stored on the mobile device, of a contact that has a telephone number that the user intends to call. In response to receiving the user input, the mobile device can determine that the telephone number that the user intends to call is mapped to a business's registered finite state machine. The mobile device can then cause menus of selectable options, indicated in the business's registered finite state machine, to be displayed to the user (e.g., on a touchscreen on the mobile device) in an interactive manner instead of placing the telephone call that the user intended to make. Thus, instead of listening to long-winded rehearsals of menu options, the mobile device user can quickly view those menu options on his mobile device and can speedily select the sequence of menu options that will lead him to his desired destination at the business. The desired destination can be a human being to which the mobile device user desired to speak, in which case the mobile device can automatically establish a vocal telephone call session between the mobile device user and the desired human contact.

The following detailed description together with the accompanying drawings will provide a better understanding of the nature and advantages of the present invention.

BRIEF DESCRIPTION

DETAILED DESCRIPTION

Figure 1:
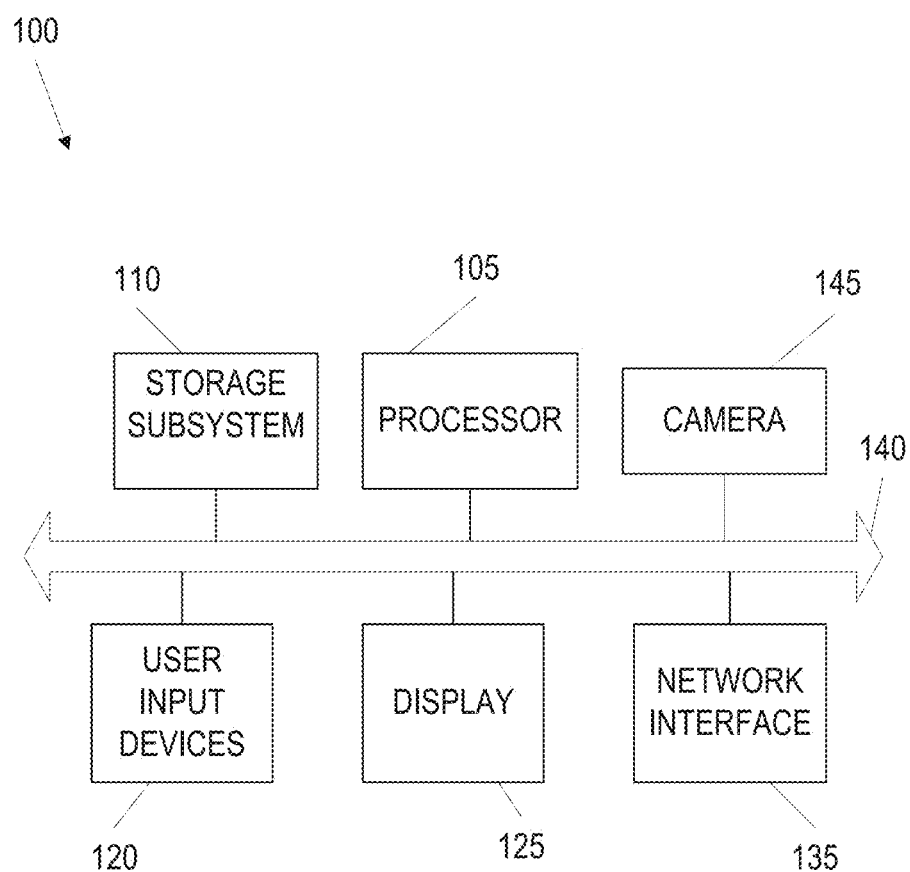
FIG. 1 is a block diagram of a computer system according to an embodiment of the present invention.

FIG. 1 illustrates a computing system 100 according to an embodiment of the present invention. Computing system 100 can be implemented as any of various computing devices, including, e.g., a desktop or laptop computer, tablet computer, smart phone, personal data assistant (PDA), or any other type of computing device, not limited to any particular form factor. Computing system 100 can include processing unit(s) 105, storage subsystem 110, input devices 120, display 125, network interface 135, and bus 140. Computing system 100 can be an iPhone or an iPad.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FP-GAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of computing system 100. The permanent storage device can be a read-and-write memory device. This permanent storage device can be a non-volatile memory unit that stores instructions and data even when computing system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105. "Software" refers generally to sequences of instructions that, when executed by processing unit(s) 105 cause computing system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by computing system 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for computing system 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of computing system 100. For example, bus 140 can communicatively couple processing unit(s) 105 with storage subsystem 110. Bus 140 also connects to input devices 120 and display 125. Bus 140 also couples computing system 100 to a network through network interface 135. In this manner, computing system 100 can be a part of a network of multiple computer systems (e.g., a local area network (LAN), a wide area network (WAN), an Intranet, or a network of networks, such as the Internet. Any or all components of computing system 100 can be used in conjunction with the invention.

A camera 145 also can be coupled to bus 140. Camera 145 can be mounted on a side of computing system 100 that is on the opposite side of the mobile device as display 125. Camera 145 can be mounted on the "back" of such computing system 100. Thus, camera 145 can face in the opposite direction from display 125.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for computing system 100. For example, processing unit(s) 105 can execute a visual dialing application. In some embodiments, the visual dialing application is a software-based process that can determine whether a telephone number is mapped to a registered finite state machine, and, if so, can present menus indicated by that finite state machine instead of placing a telephone call to the telephone number.

It will be appreciated that computing system 100 is illustrative and that variations and modifications are possible. Computing system 100 can have other capabilities not specifically described here (e.g., mobile phone, global positioning system (GPS), power management, one or more cameras, various connection ports for connecting external devices or accessories, etc.). Further, while computing system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Finite State Machine Registration System

Figure 2:
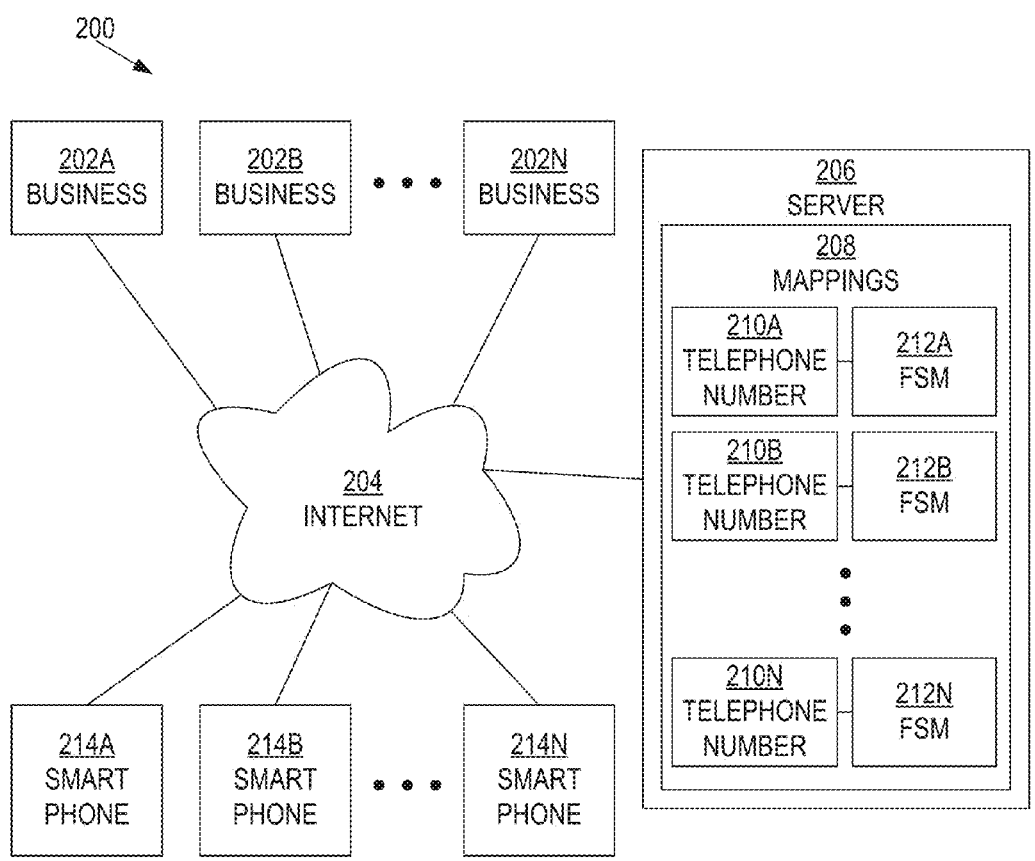
FIG. 2 is a block diagram illustrating an example of a system through which businesses can register finite state machines with a server, and through which mobile devices can present visual menus instead of placing telephone calls to those businesses, according to an embodiment of the invention.

FIG. 2 is a block diagram illustrating an example of a system 200 through which businesses can register finite state machines (FSMs) with a server, and through which mobile devices can present visual menus instead of placing telephone calls to those businesses, according to an embodiment of the invention. System 200 can include businesses 202A-N, the Internet 204, a server 206, and smart phones 214A-N. Server 206 can store mappings 208, which can include mappings between telephone numbers 210A-N and finite state machines (FSMs) 212A-N. Although the discussion below refers to businesses 202A-N for sake of simplicity, in various embodiments of the invention, businesses 202A-N can include organizations of any kind, regardless of profit motive. Furthermore, although the discussion below refers to smart phones 214A-N for sake of simplicity, in various embodiments of the invention, smart phones 214A-N can include mobile devices of any kind.

In an embodiment of the invention, a particular one of businesses 202A-N (e.g., business 202A) can register its own finite state machine (e.g., FSM 212A) with server 206 through Internet 204. In response to this registration, server 206 can store a mapping between the business's telephone number (e.g., telephone number 210A) and the finite state machine (e.g., FSM 212A). Later, after this registration has been accomplished and the mapping has been stored, a particular one of smart phones 214A-N (e.g., smart phone 214A) can receive, from its user, input indicating an intent to place a telephone call to a particular one of businesses 202A-N (e.g., business 202A). In response to receiving the input, the particular smart phone (e.g., smart phone 214A) can communicate with server 206 via Internet 204 to determine whether the telephone number for the particular business is mapped to any finite state machine. Assuming that the user of smart phone 214A attempted to place a telephone call to business 202A, server 206 can respond to smart phone 214A over Internet 204 with FSM 212A, which is mapped to the telephone number (i.e., telephone number 210A) of business 202A in mappings 208. Due to receiving FSM 212A, smart phone 214A can responsively display a visual menu instead of placing a telephone call to business 202A. In an embodiment of the invention, the options indicated in the visual menu can be the same options that would have been audibly rehearsed to smart phone 214A if smart phone 214A had placed a telephone call to business 202A. In an embodiment of the invention, the navigation of the visual menus displayed by smart phone 214A can be similar, decision path-wise, to the navigation of the audible menus that otherwise would have been rehearsed to smart phone 214A if smart phone 214A had placed a telephone call to business 202A. Managers of business 202A can format FSM 212A in a manner that can cause this similarity to occur.

In an embodiment of the invention, businesses 202A-N can register for cloud-based services with server 206 by submitting their finite state machines 212A-N over Internet 204. Finite state machines 212A-N can be incorporated with interactive content using public service application programming interfaces (APIs). In an embodiment of the invention, finite state machines 212A-N can be Extensible Markup Language (XML) documents. Finite state machines 212A-N can express specifications of states that guide users of smart phones 214A-N through menus containing options. These states can cause smart phones 214A-N to prompt the users of smart phones 214A-N for user input (e.g., menu option selection) until the interactive visual sessions are terminated by those users. In an embodiment of the invention, any of businesses 202A-N can update their finite state machines 212A-N stored on server 206 at any time. This update can be made via Internet 204, for example. Updates made in this manner to any of finite state machines 212A-N can cause server 206 to propagate the resulting changes thereto to smart phones 214A-N immediately in response to the changes being made.

Finite State Machine Registration and Update Technique

Figure 3:
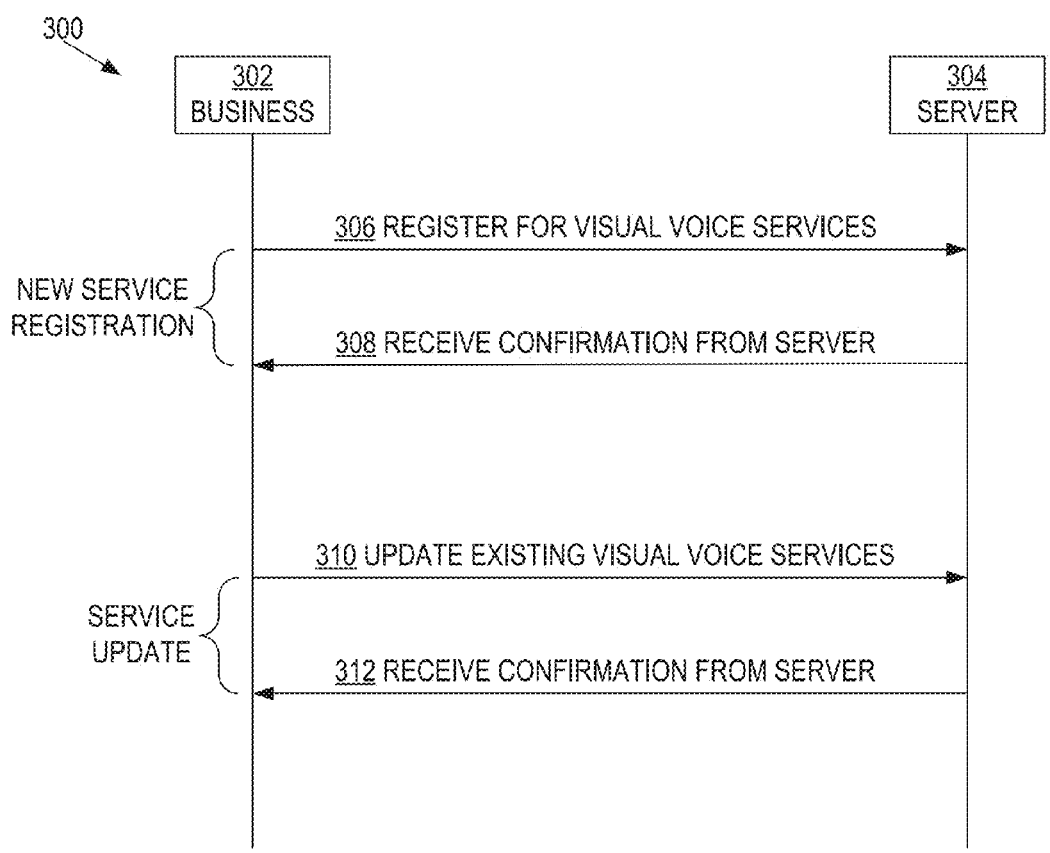
FIG. 3 is a signal flow diagram illustrating an example of a message exchange in which businesses can engage in order to register their finite state machines with a server, and to update those finite state machines, according to an embodiment of the invention.

FIG. 3 is a signal flow diagram illustrating an example of a message exchange 300 in which businesses can engage in order to register their finite state machines with a server, and to update those finite state machines, according to an embodiment of the invention. The participants in message exchange 300 can involve a business 302 and a server 304. Business 302 can be any of businesses 202A-N from FIG. 2, for example. Server 304 can be server 206 from FIG. 2, for example. In an embodiment of the invention, server 304 can be a cloud server, and the services that server 304 provides can be cloud-based services.

Messages 306 and 308 can be exchanged as a part of a new service registration. Business 302 can send message 306 to server 304 in order to register for visual voice services. In an embodiment of the invention, this registration is accomplished using public server APIs. Message 306 can take the form: registerServices(int orgID, XmlDoc *fsm). In this method invocation, orgID can be an integer that uniquely identifies business 302, and *fsm can be a pointer to an XML document that specifies the finite state machine of business 302. In response to receiving message 306, server 304 can store the finite state machine and a mapping between the orgID and the finite state machine. Once completed, server 304 can respond to business 302 with message 308, which confirms to business 302 that the registration has completed.

Messages 310 and 312 can be exchanges as a part of a service update. Business 302 can send message 310 to server 304 in order to update existing visual voice services. In an embodiment of the invention, this updating is accomplished using public server APIs. Message 310 can take the form: updateServices(int orgID, XmlDoc *fsm). In this method invocation, orgID can be an integer that uniquely identifies business 302, and *fsm can be a pointer to an XML document. This XML document can specify the updated finite state machine of business 302 or this XML document can specify updates to be made to the existing finite state machine of business 302. In response to receiving message 310, server 304 can update the finite state machine that is mapped to the orgID based on the XML document. Once completed, server 304 can respond to business 302 with message 312, which confirms to business 302 that the update has completed.

In one embodiment of the invention, business 302 can use a finite state machine builder tool that enables business 302 to build its finite state machine in a visual manner. Such a tool can be implemented as an online tool that is hosted by server 304 and accessible over networks. Alternatively, such a tool can be implemented as an application that business 302 can execute on its own computing devices.

In one embodiment of the invention, business 302 can register multiple different finite state machines with server 304. In such an embodiment, each such finite state machine can be mapped, on server 304, to a different set of dates and/or times-of-day. For example, in one embodiment of the invention, business 302 can register a default finite state machine, a holiday finite state machine that is mapped to certain dates that are holidays, and an after-hours business finite state machine that is mapped to times-of-day that occur outside of business hours. In such an embodiment, the choice of finite state machine that server 304 serves to a mobile device can depend on the date and time that the mobile device attempts to place a telephone call to business 302. In an alternative embodiment of the invention, instead of business 302 registering multiple different finite state machines with server 304, business 302 can register a single combined finite state machine that contains all of the content that otherwise would have been contained in such multiple separate finite state machines. In such a single combined finite state machine, conditions can be specified for executing different parts of that finite state machine. For example, a first part of the finite state machine might be executed after business hours, while a second part of the finite state machine might be executed instead by default. In yet another alternative embodiment of the invention, business 302 can register, with server 304, multiple separate server finite state machines that contain links to each other, such that a service or part of a service in one finite state machine can be "jumped to" from a service or part of a service in another finite state machine.

Telephone Number-to-Finite State Machine Matching Technique

Figure 4:
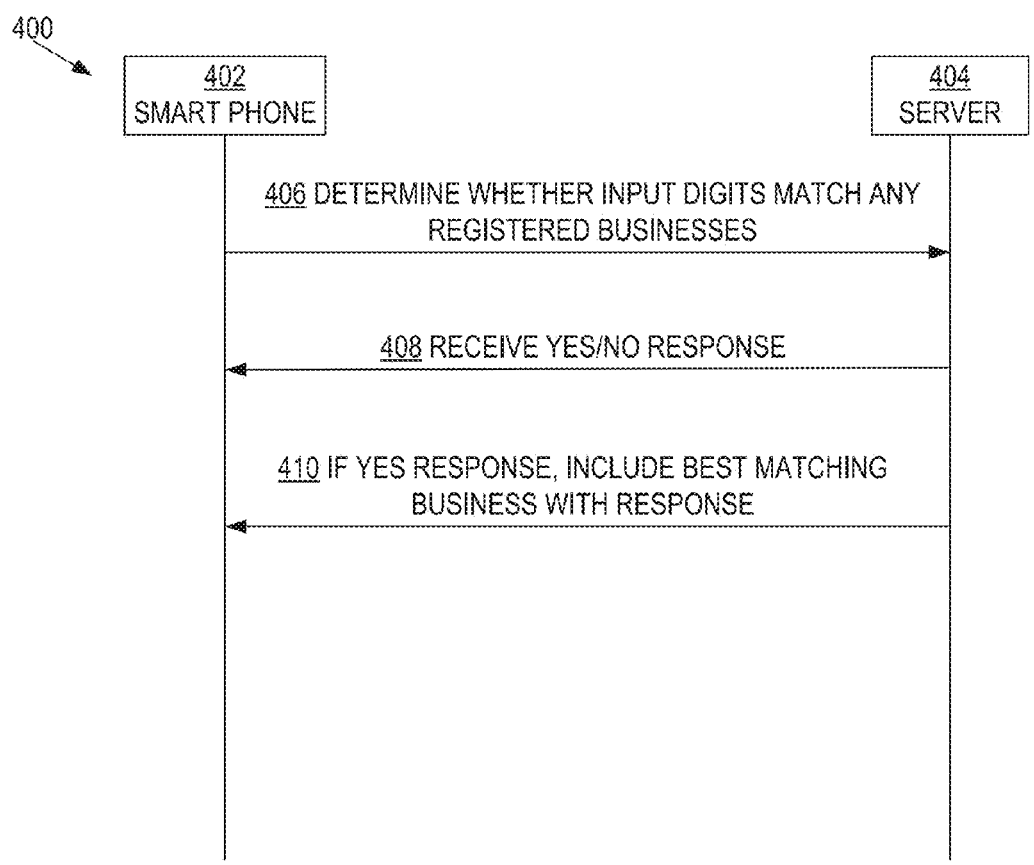
FIG. 4 is a signal flow diagram illustrating an example of a message exchange in which mobile devices can engage in order to find registered finite state machines that are mapped to telephone numbers indicated by users of those mobile devices, according to an embodiment of the invention.

FIG. 4 is a signal flow diagram illustrating an example of a message exchange 400 in which mobile devices can engage in order to find registered finite state machines that are mapped to telephone numbers indicated by users of those mobile devices, according to an embodiment of the invention. The participants in message exchange 400 can involve a smart phone 402 and a server 404. Smart phone 402 can be any of smart phones 214A-N from FIG. 2, for example. Server 404 can be server 206 from FIG. 2, for example. In an embodiment of the invention, server 404 can be a cloud server, and the services that server 404 provides can be cloud-based services.

Smart phone 402 can send message 406 to server 404 as a user of smart phone 402 begins to select (or "dial") digits on the telephone keypad displayed by smart phone 402. Message 406 can be sent via a data channel using protocols such as Hypertext Transfer Protocol (HTTP) and Transmission Control Protocol/Internet Protocol (TCP/IP), for example. Message 406 can indicate the string of digits that the user of smart phone 402 has currently input. Thus, the user continues to enter digits, smart phone 402 can send new versions of message 406 to server 404 expressing a more complete string. In response to receiving message 406, server 404 can examine its stored mappings between telephone numbers and finite state machines in order to determine whether any business having a telephone number that at least partially matches the string has registered a finite state machine. If the string at least partially matches such a telephone number, then server 404 can return message 408 to smart phone 402, indicating that a match was found. Alternatively, if the string does not match any such a telephone number, then server 404 can return message 408 to smart phone 402, indicating that no match was found. Additionally, if the string at least partially matches such a telephone number, then server 404 can return message 410 to smart phone 402, identifying the business having the best matching telephone number. In one embodiment of the invention, server 404 can return message 410 to smart phone 402 as a Javascript Object Notation (JSON) element using an asynchronous Hypertext Transfer Protocol (HTTP) request. In one embodiment of the invention, if the string does not match any telephone number then message exchange 400 can be repeated with each additional digit input (or deleted) by the user of smart phone 402.

In one embodiment of the invention, in response to receiving message 410 that indicates that a matching business was located, smart phone 402 can modify an element of its telephony application user interface in order to indicate, to the user of smart phone 402, that instead of placing a regular voice telephone call, smart phone 402 will initiate an interactive visual data session with the matching business. For example, smart phone 402 can modify a color of a "call" button displayed within the user interface so that the button is blue rather than the normal green. Even though a data session initially can be initiated instead of a regular voice telephone call, it is possible for a regular voice telephone call to be initiated at some point during the interactive visual data session. The data session can involve the interchange of TCP/IP data packets containing textual payloads, for example. In an embodiment of the invention, in response to receiving message 410 that indicates that a matching business was located, smart phone 402 can additionally or alternatively indicate, within its telephony application user interface, the identity of the matching business.

In one embodiment of the invention, in response to receiving message 410 that indicates that a matching business was located, smart phone 402 can determine, using built-in sensors such as a gyroscope, whether smart phone 402 is currently being held in a position (i.e., up to the ear) that suggests that the user of smart phone 402 is attempting to place a voice telephone call. In response to determining that the user of smart phone 402 is attempting to place a voice telephone call, smart phone 402 can automatically disable the initiation of an interactive visual data session of the kind discussed above, and can proceed to place a regular voice telephone call instead.

Figure 5:
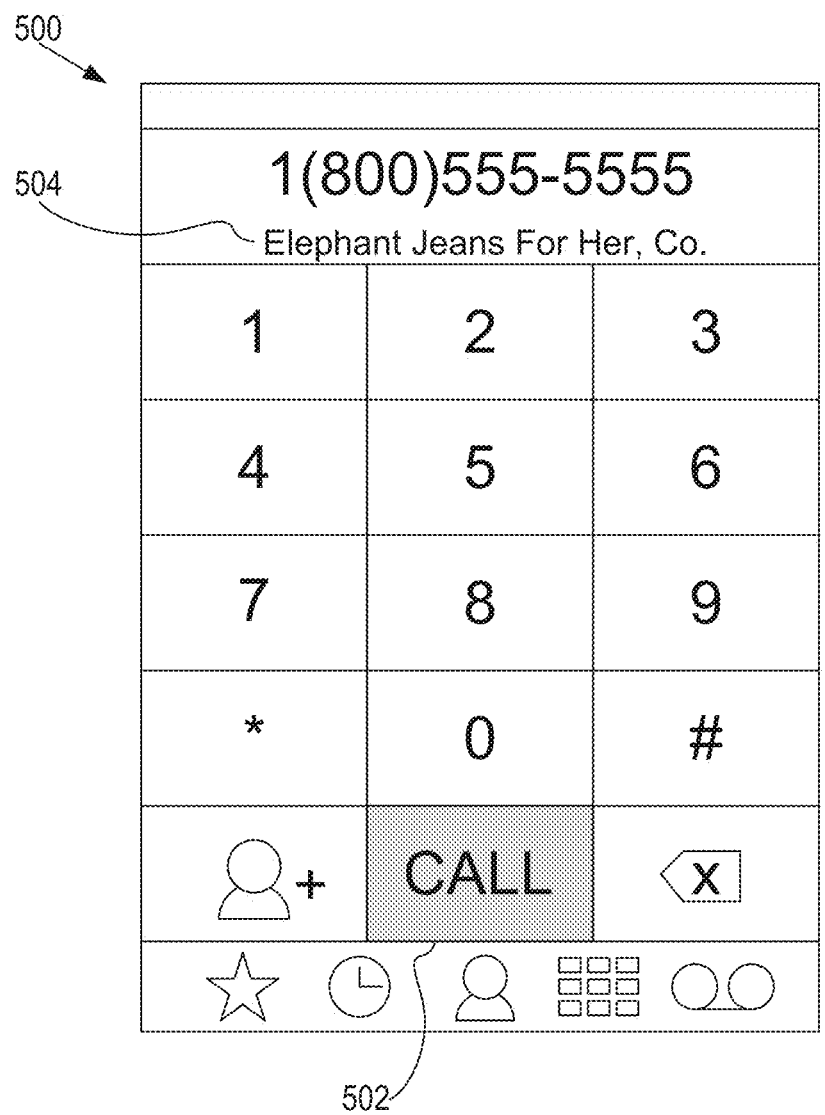
FIG. 5 is a block diagram illustrating an example of a telephone number-dialing user interface that a mobile device can modify in response to determining that an input telephone number matches a business that has registered a finite state machine, according to an embodiment of the invention.

FIG. 5 is a block diagram illustrating an example of a telephone number-dialing user interface 500 that a mobile device can modify in response to determining that an input telephone number matches a business that has registered a finite state machine, according to an embodiment of the invention. Interface 500 includes depicted digit-bearing user interface elements (i.e., buttons) that the user of the mobile device can select in order to cause corresponding digits to appear in a string of digits shown within interface 500. The string of digits (in this example, "1(800)555-555") indicates the telephone number to which the user intends to place a telephone call. In response to receiving an indication that a business matches this string (as discussed above in connection with FIG. 4), the mobile device can cause a color of call button 502 to change (e.g., from green to blue), and can cause an identity of the matching business 504 (in this example, "Elephant Jeans For Her, Co.") to be displayed below the entered telephone number string.

The discussion above contemplates an embodiment in which the mobile device user manifests his intent to make a telephone call by beginning to select digits in a telephone number-dialing user interface. However, in alternative embodiments of the invention, different kinds of user input can manifest such intent to make a telephone call in other ways. For example the user input can involve the user's speaking, into a microphone of the mobile device, of the name of an entity to which the user wants to place a telephone call; or the user input can involve the user's selection, from a contact list stored on the mobile device, of a contact that has a telephone number that the user intends to call. The receipt of any of these or other forms of telephone-call-intent-manifesting user input can trigger the business-to-telephone number matching technique described above.

Visual Call Initiation Technique

Figure 6:
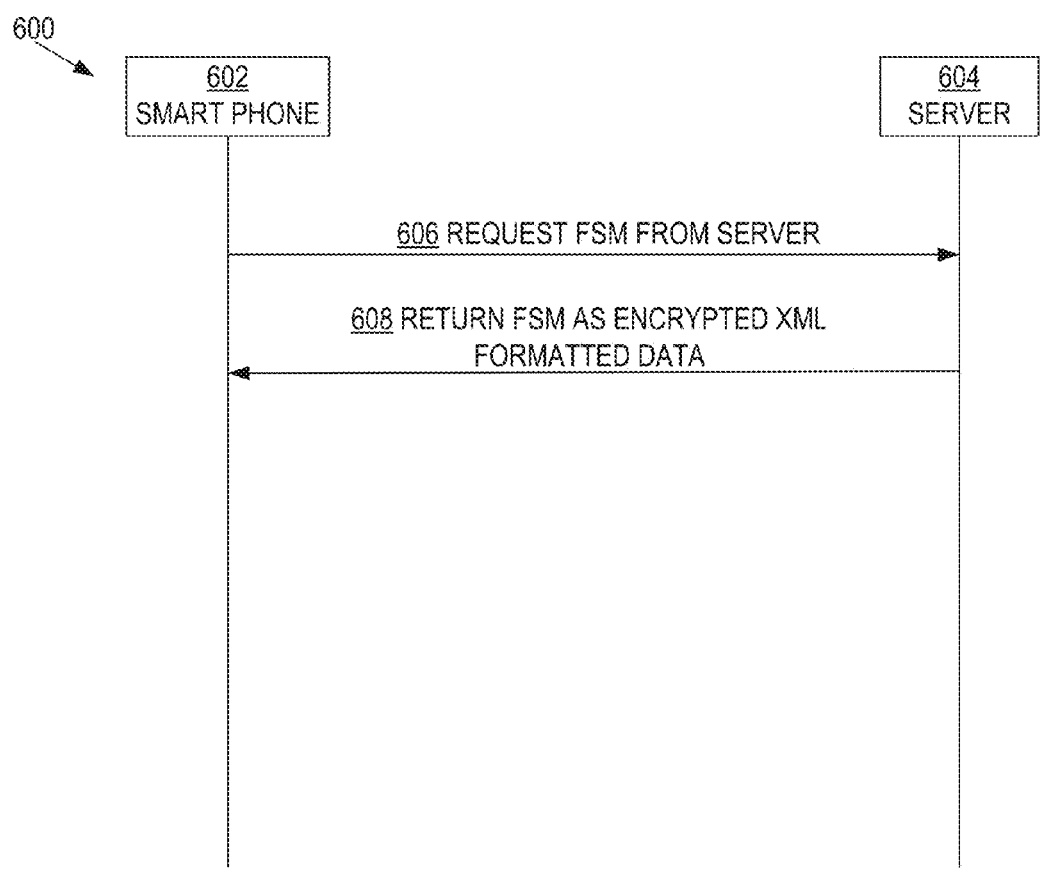
FIG. 6 is a signal flow diagram illustrating an example of a message exchange in which mobile devices can engage in order to initiate an interactive visual data session with a business that is mapped to a specified telephone number, according to an embodiment of the invention.

FIG. 6 is a signal flow diagram illustrating an example of a message exchange 600 in which mobile devices can engage in order to initiate an interactive visual data session with a business that is mapped to a specified telephone number, according to an embodiment of the invention. The participants in message exchange 600 can involve a smart phone 602 and a server 604. Smart phone 602 can be any of smart phones 214A-N from FIG. 2, for example. Server 604 can be server 206 from FIG. 2, for example. In an embodiment of the invention, server 604 can be a cloud server, and the services that server 604 provides can be cloud-based services.

Smart phone 602 can send message 606 to server 604 in order to request a finite state machine that is mapped to the matching business discussed above in connection with FIG. 4. In an embodiment of the invention, this request is made using public server APIs. Message 606 can take the form: retrieveSrvcFSM(int orgID). In this method invocation, orgID can be an integer that uniquely identifies the matching business. In response to receiving message 606, server 604 can consult its set of stored mappings (e.g., mappings 208 of FIG. 2) and locate the finite state machine that is mapped to the orgID. Once the appropriate finite state machine has been located, server 604 can respond to smart phone 602 with message 608, which, in one embodiment of the invention, can include the entire finite state machine in an encrypted XML format. In one embodiment of the invention, smart phone 602 can locally store the finite state machine in its memory in response to receiving the finite state machine from server 604.

In one embodiment of the invention, smart phone 602 can delete the finite state machine from its memory in response to the termination of the interactive visual data session. In an alternative embodiment of the invention, smart phone 602 can continue to store the finite state machine in its memory even after the termination of the interactive visual data session. In such an alternative embodiment of the invention, before and potentially instead of performing the techniques discussed above in connection with FIGS. 3 and 4, smart phone 602 can first determine whether a finite state machine for the user-inputted telephone number already is stored in the smart phone's memory. In response to determining that such a finite state machine is already stored in the smart phone's memory, smart phone 602 can use that locally stored finite state machine to initiate the interactive visual data session instead of requesting and receiving a finite state machine from server 604. However, in one embodiment of the invention, the version of the locally stored finite state machine is compared with the version of the finite state machine stored on server 604, and, if the version of the finite state machine stored on server 604 is a newer version of the finite state machine, then smart phone 602 can responsively request from server 604, receive from server 604, and locally store in memory the newer version of the finite state machine.

Displaying Visual Call Options to Smart Phone Users

According to an embodiment of the invention, after a smart phone has retrieved the appropriate matching finite state machine from the server as discussed above in connection with FIG. 6, the smart phone can display, to its user, a first menu of options that are specified by the finite state machine—potentially as XML elements in an XML document. The user selection of any of these options (e.g., through a touchscreen of the smart phone) can cause the smart phone to display further menus of options that are specified by the finite state machine. The finite state machine can indicate, for each option, a subsequent menu that is to be displayed in response to the user selection of that option. The business that registered the finite state machine with the server can design the finite state machine's menus and structure in such a way that the visual menus can contain the same or similar options to those that otherwise would have been audibly rehearsed to the smart phone user if a regular voice telephone call to the business's telephone number had been made instead.

In one embodiment of the invention, the finite state machine additionally indicates user interface controls, images, sounds, etc., that can be presented in addition to the specified menu options in order to enhance the experience of the smart phone's user during the interactive visual data session. Some of the content presented in the session can be static in nature, while some of the content presented in the session can be dynamic in nature. Static content can include, for example, the times of day during which the business is open, the address of the business's stores, and other general information that tends not to change very often if at all. Dynamic content, in contrast, can include, for example, information related to the business account of the particular smart phone user (which will vary depending on the user's identity and the current state of his account), personalized options that the smart phone user has set, and information indicating the smart phone user's payment history (e.g., through an Apple iTunes account). In one embodiment of the invention, the finite state machine can include user authentication features that operate to ensure that the user can supply correct credentials for his account before proceeding further.

Figure 7:
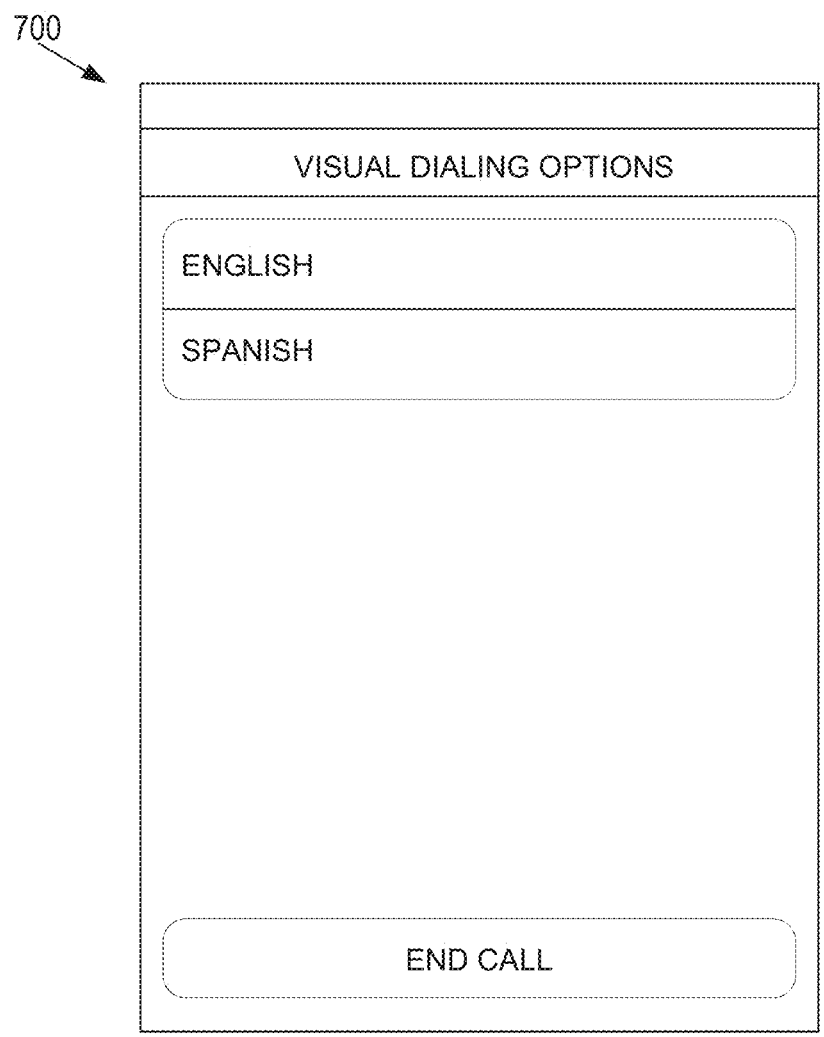
FIG. 7 is a block diagram illustrating an example of a language selection user interface that a mobile device can present during an interactive visual data session as specified by a part of a finite state machine, according to an embodiment of the invention.

FIG. 7 is a block diagram illustrating an example of a language selection user interface 700 that a mobile device can present during an interactive visual data session as specified by a part of a finite state machine, according to an embodiment of the invention. In user interface 700, options for selecting either English or Spanish language are shown. The portions of the finite state machine that are later followed in generating further menus can depend on the user's selection from user interface 700. In on embodiment of the invention, language selection by the user is not required because the smart phone obtains the user's language preference automatically from the smart phone's locally stored settings and preferences. After a language has been selected, in one embodiment, the smart phone can responsively display a main menu user interface such as that shown by way of example in FIG. 8.

Figure 8:
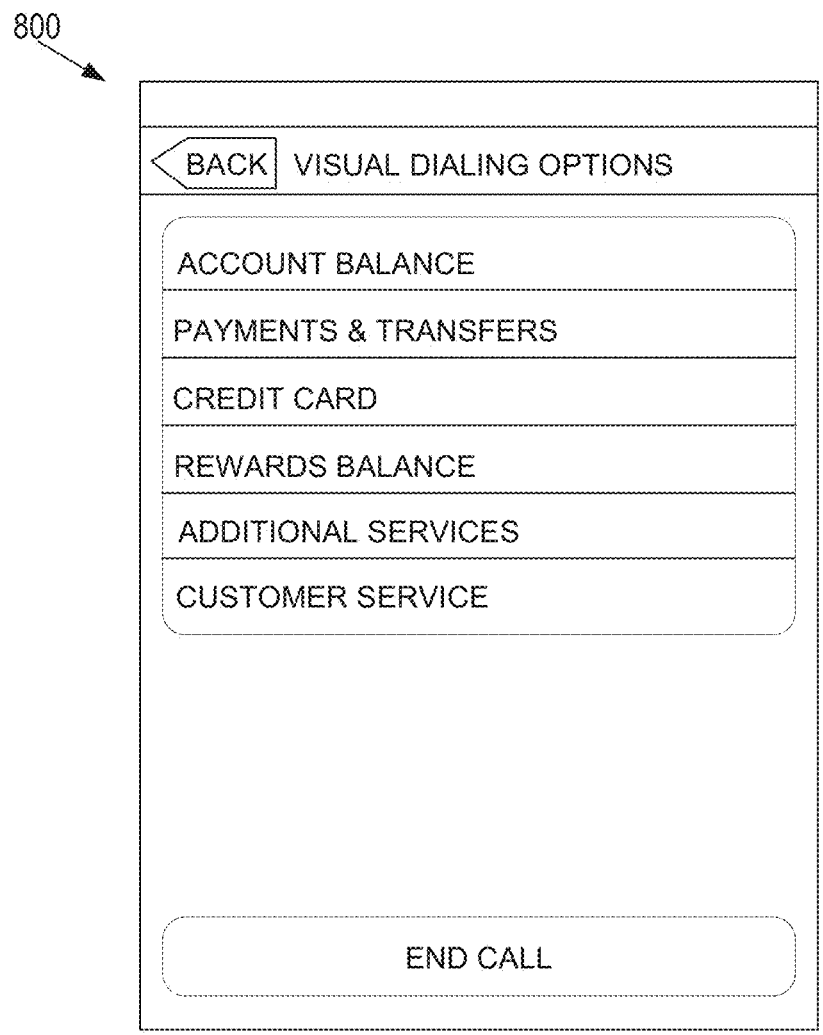
FIG. 8 is a block diagram illustrating an example of a main menu user interface that a mobile device can present during an interactive visual data session as specified by a part of a finite state machine, according to an embodiment of the invention.

FIG. 8 is a block diagram illustrating an example of a main menu user interface 800 that a mobile device can present during an interactive visual data session as specified by a part of a finite state machine, according to an embodiment of the invention. Each of the displayed menu options can be indicated as a separate XML element within the finite state machine. In response to a user's selection of the "account balance" option from user interface 800, the smart phone can responsively display a security authentication user interface such as that shown by way of example in FIG. 9.

Figure 9:
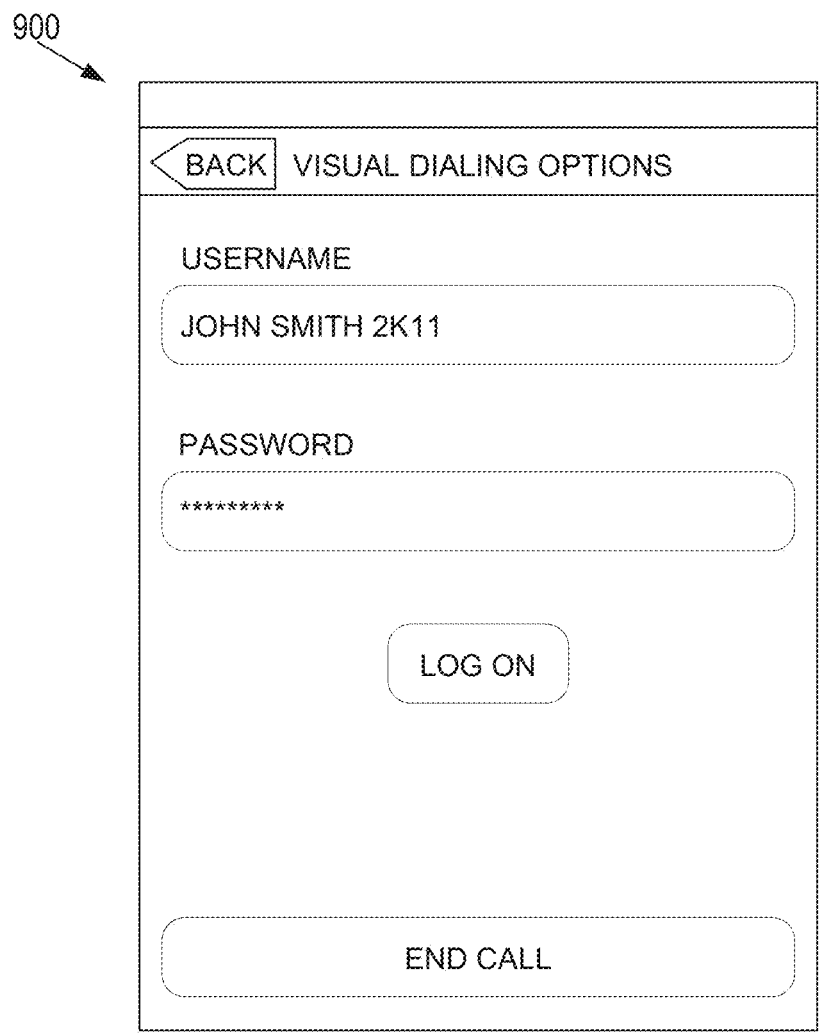
FIG. 9 is a block diagram illustrating an example of a security authentication user interface that a mobile device can present during an interactive visual data session as specified by a part of a finite state machine, according to an embodiment of the invention.

FIG. 9 is a block diagram illustrating an example of a security authentication user interface 900 that a mobile device can present during an interactive visual data session as specified by a part of a finite state machine, according to an embodiment of the invention. User interface 900 contains fields in which the smart phone user can supply his username and password. After the smart phone user has entered this information into these fields and selected the "log on" button, the smart phone can send this information to the business's own account server (separate from the cloud server that maintains the finite state machines for multiple organizations). The finite state machine can indicate, within metadata, the uniform resource locator (URL) or other network address of the business's server to which the smart phone is to send the information. The business's own account server can confirm that this information is correct and reply to the smart phone with a message indication confirmation. In response to this message, the smart phone can then proceed to display an account balance user interface such as that shown by way of example in FIG. 10.

Figure 10:
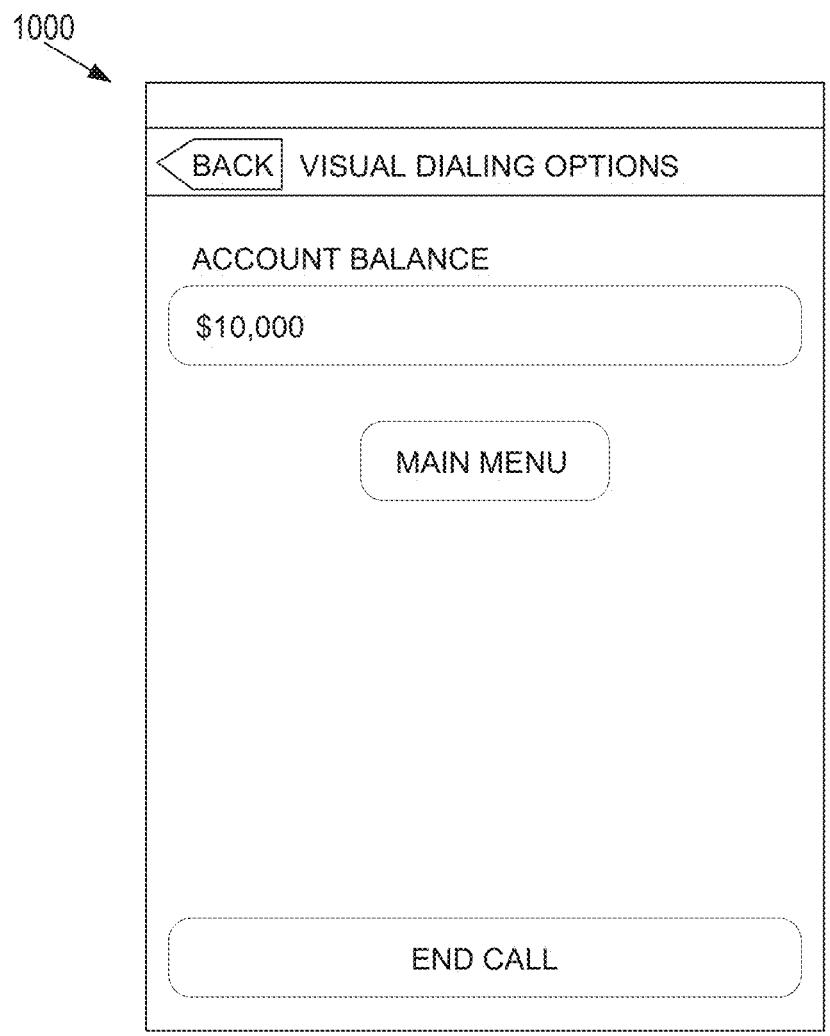
FIG. 10 is a block diagram illustrating an example of an account balance user interface that a mobile device can present during an interactive visual data session as specified by a part of a finite state machine, according to an embodiment of the invention.

FIG. 10 is a block diagram illustrating an example of an account balance user interface 1000 that a mobile device can present during an interactive visual data session as specified by a part of a finite state machine, according to an embodiment of the invention. The finite state machine can indicate that the smart phone is to request the account balance information from the business's own account server for display within the specified account balance field. This is an example of dynamic content. User interface 1000 also contains a "main menu" button which, when selected, causes the smart phone to once again present the main menu user interface shown by way of example in FIG. 8. The interactive and random-access nature of the navigation in the visual data session helps the smart phone's user to feel more in control of the interaction that he otherwise would during a regular voice telephone call. After returning to the main menu of FIG. 8, the smart phone's user might select the "additional services" option, which can cause the smart phone to display an additional services user interface such as that shown by way of example in FIG. 11.

Figure 11:
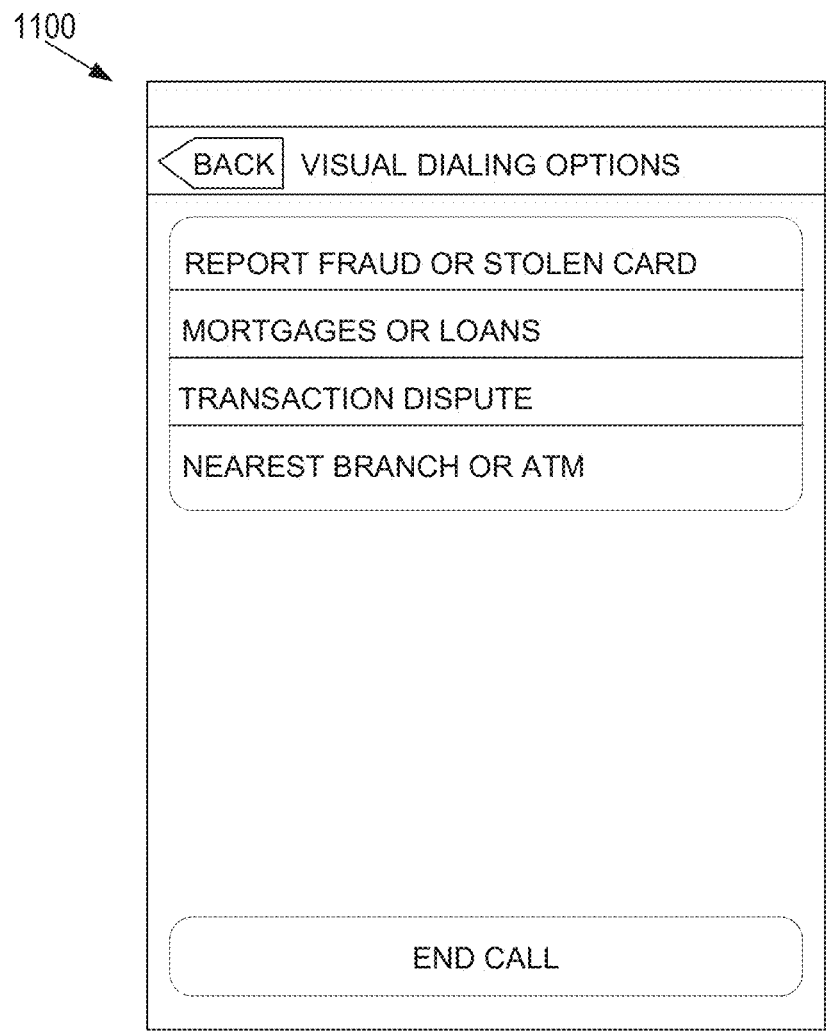
FIG. 11 is a block diagram illustrating an example of an additional services user interface that a mobile device can present during an interactive visual data session as specified by a part of a finite state machine, according to an embodiment of the invention.

FIG. 11 is a block diagram illustrating an example of an additional services user interface 1100 that a mobile device can present during an interactive visual data session as specified by a part of a finite state machine, according to an embodiment of the invention. The smart phone user's selection of the "report fraud or stolen card" can cause the smart phone to present the security authentication user interface of FIG. 9 if the user has not already supplied his credentials during the current session. Following authentication, the finite state machine can specify a telephone number (and potentially an extension) to which the smart phone is to place a regular voice telephone call so that the smart phone user can speak to a human being about his issues. The telephone number in this case could be a direct number to the business's fraud or stolen card department. The telephone call can be made using voice over IP (VoIP) or more traditional voice calling services. After the smart phone automatically places the voice telephone call in response to the user's selection of the menu option, the interactive visual data session can end, and the smart phone can carry on the voice telephone call in the usual manner.

In one embodiment of the invention, the smart phone user can select a user interface element to "bookmark" or save the current state of the interactive visual data session. In such an embodiment, the user can select this bookmark from a list of bookmarks in order to cause the smart phone to return directly to the bookmarked state in that or another, separate interactive visual data session. The smart phone can therefore return directly to this state without forcing the user to navigate through any previous states indicated in the finite state machine.

Company Profiles

In an embodiment of the invention, a business desiring to use the visual dialing technique discussed above can create a customer service profile. This customer service profile can specify basic information about the business, such as the business's e-mail address, the business's fax number, the business's voice mail address, etc. In one embodiment of the invention, the visual dialing techniques simplify communication between businesses and their smart phone-using customers by making this customer service profile information available in an interactive visual data session in response to user selection of a particular menu option. Thus, even if a user only knows the business's telephone number, the user can employ the customer service profile information in order to send an e-mail message, a fax, or a voice mail for the business. In an embodiment of the invention, such customer service profile information is stored in mappings 208 on server 206 of FIG. 2, along with the business's identity. In one embodiment of the invention, such customer service profile information can be displayed along with, or instead of, the identity of the matching business that is displayed in the interface of FIG. 5 in response to the finding of a business that is mapped to the telephone number within mappings 208. This makes the business's contact information highly accessible. Various services on the user's smart phone, such as automated intelligent voice-recognizing agents (e.g., Apple Siri) can use such contact information in order to fulfill a user's require made using those services. Such contact information can also be made susceptible to bookmarking for future use.

Payments and Single Sign-On

In an embodiment of the invention, businesses that provide services (e.g., internet service providers, cable companies, restaurants, etc.) can make use of another company's (e.g., Apple, Inc.'s) existing payment services (e.g., via Apple iTunes). In an embodiment of the invention, an authentication finite state machine can call for the username (e.g., Apple ID) and password known to the payment service. The other service-providing businesses can trust this authoritative authentication so that they do not need to ask the user for his credentials separately relative to their own businesses, thus providing a "single sign-on" mechanism. Thereafter, the smart phone can allow the user to conduct transactions and make purchases relative to the other service-providing businesses using the payment service.

Security

In an embodiment of the invention, a finite state machine can specify a potentially different level of security for each state described therein. In such an embodiment, the smart phone can enforce the indicated security level before permitting the user interface corresponding to the machine state to be displayed or accessed. For example, in one embodiment of the invention, each machine state can be associated with one of three levels of security: (1) public, or insecure level, which provides no security at all; (2) visual dialing service level, which requires entry of credentials that are known to the server that maintains the finite state machine (e.g., server 206 of FIG. 2); or (3) business level, which requires entry of credentials that are known to the particular business that registered the finite state machine with the server.

Statistical Reporting

In an embodiment of the invention, the smart phone tracks the states of the finite state machine that the smart phone's user traverses during the interactive visual data session. In such an embodiment, the smart phone can report various statistics to the server for aggregation and compilation and reporting back to the business that registered that finite state machine. The business can then use these reported statistics in order to improve and update its finite state machine. In an embodiment of the invention, these statistics can include: (a) a quantity of times that each menu option was selected, (b) questions that were frequently asked in the sessions, (c) an identity of menu options that are unused, (d) a ratio of sessions that ended without resulting in the placement of a voice telephone call, (e) an indication by smart phone user of the kinds of menu options that they wish were present in the session, and/or (f) direct customer feedback.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
   receiving, at a device, information for placing a voice call to a contact;
   in response to receiving the information for placing the voice call, determining that a set of stored mappings includes a particular mapping between the contact and a particular set of one or more menus; and in response to determining that the set of mappings includes the particular mapping, instead of establishing a voice channel, displaying, on the device, a set of user-selectable options that are based on the particular set of one or more menus.

2. The method of claim 1, wherein receiving the information for establishing the voice channel comprises receiving a telephone number.

3. The method of claim 1, further comprising: in response to determining that the set of mappings includes the particular mapping, modifying an appearance of an element of a user interface of the device to indicate visually that a voice channel will not be established in response to an instruction to establish the voice channel.

4. The method of claim 1, wherein determining that the set of stored mappings includes the particular mapping comprises: sending a contact identifier for the contact from the device over a network to a server on which the mappings are stored.

5. The method of claim 1, further comprising:
receiving the particular set of one or more menus over a network from a server on which the mappings are stored.

6. The method of claim 1, wherein receiving the information for placing the voice call to the contact comprises receiving the information through a user interface that is configured to enable a user of the device to place a voice call by inputting a contact identifier associated with the contact.

7. The method of claim 1, further comprising:
retrieving a finite state machine corresponding to the set of one or more menus from a finite state machine server, wherein the particular finite state machine is associated with a particular organization;
entering into a first state of the particular finite state machine;
determining a first security level that is associated with the first state in the particular finite state machine; and
requesting from a user, a first set of credentials that are recognized by the finite state machine server in response to a determination that the first security level requires authentication by the finite state machine server.

8. The method of claim 7, further comprising:
entering into a second state of the particular finite state machine;
determining a second security level that is associated with the second state in the particular finite state machine; and
requesting, from the user, a second set of credentials that are recognized by the particular organization in response to a determination that the second security level requires authentication by the particular organization.

9. The method of claim 7, further comprising:
sending, over a wireless network, to a network address of the finite state machine server specified in the particular finite state machine, credentials that the user supplied through a security user interface specified by the particular finite state machine;
receiving, from the finite state machine server, an indication of whether the credentials supplied by the user are authentic; and
displaying a user interface that is associated with the first state in response to receiving, from the finite state machine server, an indication that the credentials supplied by the user are authentic.

10. The method of claim 7, further comprising:
entering into a second state of the particular finite state machine
determining a second security level that is associated with the second state in the particular finite state machine; and
requesting, from the user, a second set of credentials that are recognized by the particular organization in response to a determination that the second security level requires authentication by the particular organization;
sending, over a wireless network, to a network address of a server maintained by the particular organization, credentials that the user supplied through a security user interface specified by the particular finite state machine;
receiving, from the server maintained by the particular organization, an indication of whether the credentials supplied by the user are authentic; and
displaying a user interface that is associated with the second state in response to receiving, from the server maintained by the particular organization, an indication that the credentials supplied by the user are authentic.

11. The method of claim 1, further comprising:
retrieving, from a server that stores multiple sets of one or more menus, a particular set of one or more menus that matches a telephone number that a user instructed the device to call;
presenting, through the device, menus in the particular set of one or more menus;
storing historical data pertaining to the menus that are traversed during a particular interactive session; and
reporting the historical data to the server.

12. The method of claim 11, wherein the particular set of one or more menus is expressed by an Extensible Markup Language (XML) document that specifies menu options as separate XML elements.

13. The method of claim 11, further comprising:
storing a bookmark that refers to a particular menu of the menus that are traversed during the particular interactive session; and
re-entering the particular state directly in response to receiving user input that selects the bookmark from a set of bookmarks.

14. The method of claim 11, wherein the historical data indicates a quantity of times that each state of the particular set of one or more menus was traversed during the particular interactive session.

15. The method of claim 11, wherein the historical data identifies all menus of the particular set of one or more menus that were never traversed during the particular interactive session.

16. The method of claim 11, wherein the historical data identifies whether the particular interactive session ended without causing the device to place a voice telephone call.

17. A non-transitory computer-readable memory storing computer-executable instructions comprising:
instructions that cause a processor to receive, through a telephone number-dialing user interface, user input specifying one or more digits;
instructions that cause the processor to send the one or more digits over a wireless network to a server;
instructions that cause the processor to receive, over the wireless network, an indication that the one or more digits at least partially match a telephone number of an organization that previously registered the telephone number with the server;

instructions that cause the processor to display a call button; and instructions that cause the processor to change an appearance of the call button user interface element to a different user interface element in response to receiving the indication from the server.

18. The computer-readable memory of claim 17, wherein the computer-executable instructions comprise:

instructions that cause the processor to display an identity of the organization within the telephone number-dialing user interface in response to receiving the indication from the server;

wherein the indication specifies the identity.

19. The computer-readable memory of claim 17, wherein the computer-executable instructions comprise:

instructions that cause the processor to determine whether a mobile device on which the user interface is being displayed is being held in a specified position;

wherein the instructions that cause the processor to change the appearance of the call button user interface element are instructions that cause the processor to change the appearance of the call button user interface element in response to a determination that the mobile device is not being held in the specified position.

20. The computer-readable memory of claim 17, wherein the computer-executable instructions comprise:

instructions that cause the processor to request, over the wireless network, from the server, a set of one or more menus that is mapped to the organization and that indicates a set of user-selectable options;

instructions that cause the processor to receive the set of one or more menus over the wireless network from the server in response to the request;

instructions that cause the processor to store the set of one or more menus in a memory of a mobile device on which the user interface is being displayed; and instructions that cause the processor to display options from the set of user-selectable options.

21. The computer-readable memory of claim 17, wherein the instructions that cause the processor to send the one or more digits over the wireless network to the server comprise:

instructions that cause the processor to determine whether a memory of a mobile device on which the user interface is being displayed contains a set of one or more menus that at least partially matches the one or more digits; and instructions that cause the processor to send the one or more digits over the wireless network to the server in response to a determination that the memory of the mobile device does not contain any set of one or more menus that at least partially matches the one or more digits.

* * * * *